United States Patent [19]

Slaats et al.

[11] 3,957,239
[45] May 18, 1976

[54] JOINT CONSTRUCTION SUCH AS FOR FURNITURE AND METHOD OF MAKING

[75] Inventors: Mathew A. Slaats; J. Richard Slayton, both of Jasper, Ind.

[73] Assignee: Kimball International, Inc., Jasper, Ind.

[22] Filed: May 1, 1973

[21] Appl. No.: 356,105

[52] U.S. Cl.............................. 248/188; 52/758 H; 403/265
[51] Int. Cl.² ........................................ F16M 11/16
[58] Field of Search................... 108/156, 161, 101; 248/188, 188.1; 156/71, 94, 98, 252; 161/44; 297/440; 403/404, 231, 205, 265, 269, 365; 52/758 H, 656, 282

[56] References Cited
UNITED STATES PATENTS

| | | | |
|---|---|---|---|
| 245,516 | 8/1881 | Langston | 403/217 |
| 437,539 | 9/1890 | Warner | 248/188 |
| 2,276,753 | 3/1942 | Tinnerman | 403/356 |
| 2,392,734 | 1/1946 | Haberstump | 403/265 X |
| 2,970,025 | 1/1961 | Wilson | 108/156 |
| 3,188,693 | 6/1965 | Troyano | 52/758 H |
| 3,426,482 | 2/1969 | Mock | 52/656 |
| 3,455,605 | 7/1969 | Anderson | 297/440 |
| 3,478,791 | 11/1969 | Elmendorf | 156/94 |
| 3,529,555 | 9/1970 | Dean | 248/188 |
| 3,576,091 | 4/1971 | Shull et al. | 156/71 |
| 3,687,092 | 8/1972 | Manning | 248/188 |
| 3,741,853 | 6/1973 | Forsythe et al. | 156/98 |
| T889,025 | 8/1971 | Ulmschneider et al. | 156/252 |

*Primary Examiner*—James T. McCall
*Assistant Examiner*—Darrell Marquette
*Attorney, Agent, or Firm*—Melvin A. Crosby

[57] ABSTRACT

A joint construction, especially for furniture or the like, in which members such as rail members, or the like, which extend at angles to each other, are joined together by a plastic block formed in situ on at least a pair of the members. The block may form a joint where a furniture leg is located. The plastic block, when it is to be connected to a leg may be formed directly on the leg or it may be formed with a recess therein engageable with an end part on the leg.

5 Claims, 12 Drawing Figures

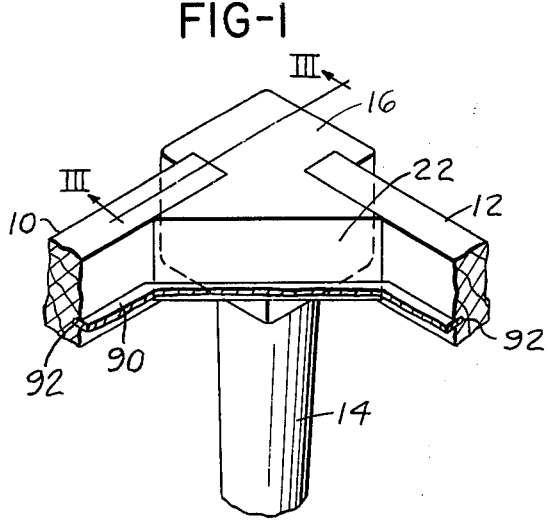
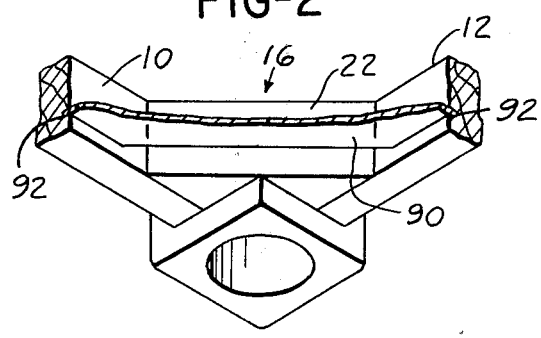
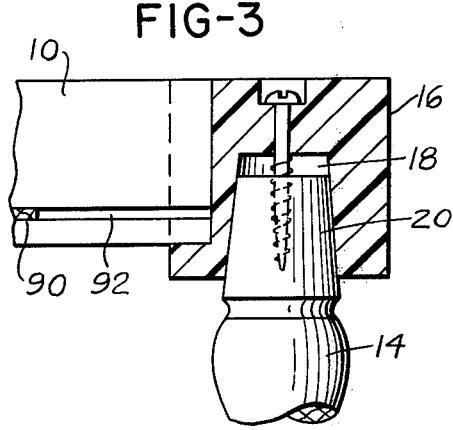
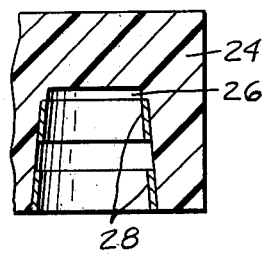
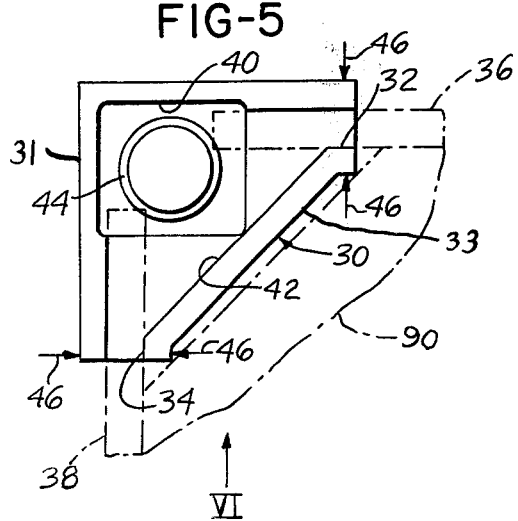
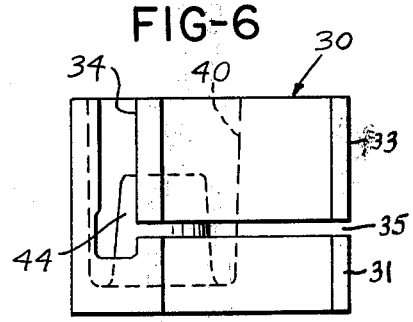

JOINT CONSTRUCTION SUCH AS FOR FURNITURE AND METHOD OF MAKING

This invention relates to joint constructions, especially for furniture and the like, and is particularly concerned with a joint construction for joining members such as furniture rails together. The invention is of particular benefit when used at a joint where a furniture leg is located but has general application to joints wherein rails of wood, or the like, meet and are to be fixed together.

Articles, of furniture having corner portions are well known, and other articles also embody joint constructions. In respect of furniture, however, a great many articles have joints where rails meet, often at an angle, and are interconnected. Such joints may also have a furniture leg connected thereto.

Some examples of this type of construction are tables, including conference tables, chairs and benches, including piano and organ benches.

A bench for a piano or organ is a particularly good example of an article of furniture having joint constructions where legs are located. It is important to fabricate such joints so as to obtain maximum strength. This comes about because such benches have rather long legs and the superstructure, top, or upper portion, is relatively shallow and substantial loads are imposed on the benches, including forces which are imposed in the lateral direction of the superstructure or upper portion of the bench. The joints at the corners of such a bench, due to the type of loading imposed on the bench and the length of the legs, are quite heavily loaded, and it is a common occurrence for these joints to become loose. However, many other articles of furniture have similar joints and the benches referred to herein are considered merely to be exemplary of the wide field of use of the present inventions.

A common type of joint for a furniture article involves a pair of rails and a leg meeting to form the joint and held together by a member, disposed diagonally inside the rails, usually a metal member, and through which a screw passes which engages the leg. By tightening the screw up, the rails which meet at the joint and the leg are fixed together. However, in order to get good engagement of the diagonally disposed member with the rails, the rails are usually slotted to engage the ends of the diagonal member thereby weakening the rails. Furthermore, if the load imposed on the connecting screw is high the screw may become loose or, if the aforementioned diagonal member is metal, the member may bend.

In still other instances, a furniture joint may be located where rails meet and where no leg may be located.

Having the foregoing in mind, the primary objective of the present invention is the provision of a joint construction of the nature referred to which is stronger than heretofore known joint constructions.

A still further object is the provision of a joint construction of the nature referred to which is inexpensive to make and which does not tend to become loose, even when the joint is heavily loaded.

Another object is the provision of a furniture joint structure which does not tend to loosen when the joint is subjected to a shifting load.

Still another object is the provision of a method of making a joint of the nature referred to.

These and other objects and advantages of the present invention will become more apparent upon reference to the following detailed specification taken in connection with the accompanying drawings in which:

FIG. 1 is a perspective view showing a joint construction according to the present invention looking down from above.

FIG. 2 is a view similar to FIG. 1 but looking up at the joint construction from below.

FIG. 3 is a section of a joint construction indicated by line III—III on FIG. 1.

FIG. 4 is a fragmentary view like FIG. 3 but showing a modification.

FIG. 5 is a plan view looking down on top of a mold employed for making the joint.

FIG. 6 is a side view of the mold looking in from the bottom of FIG. 5.

Figure 7:
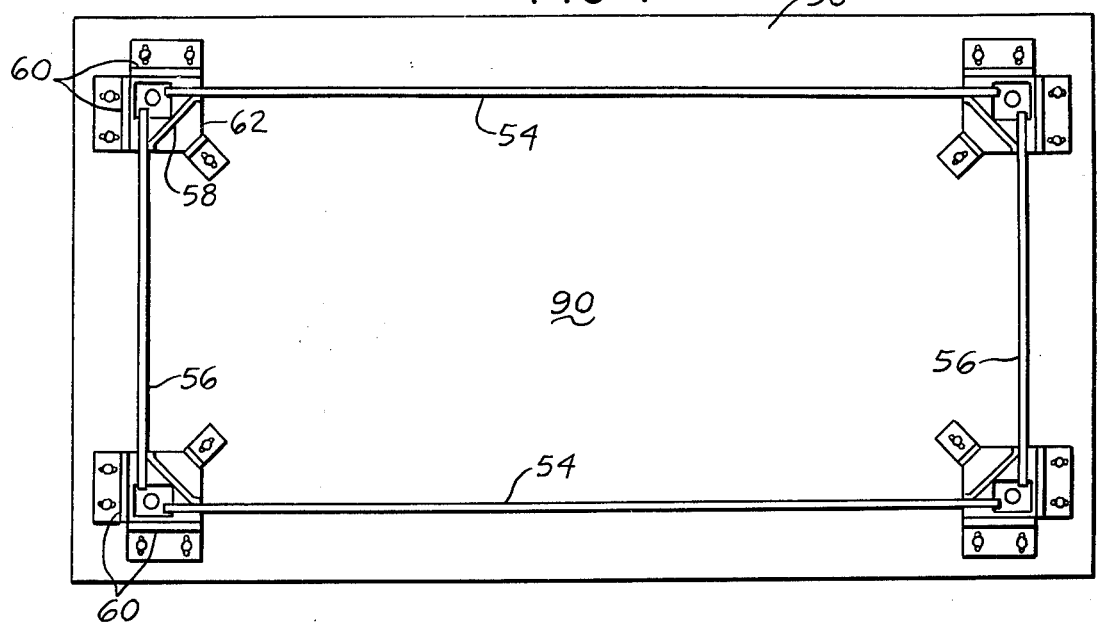

FIG. 7 schematically illustrates one way in which the mold and the furniture rails to be joined thereby can be fixtured during the molding process.

Figure 8:
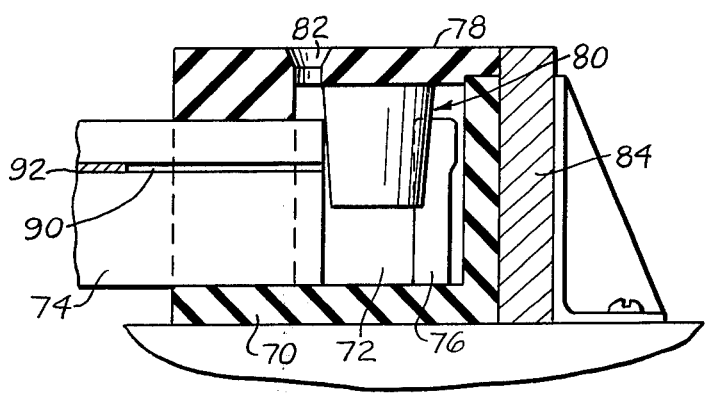

FIG. 8 is a view showing a mold of the type illustrated in FIGS. 5 and 6 except inverted so that the mold material is poured into the mold cavity from the bottom thereof rather than from the top as in the case of the FIGS. 5 and 6 mold.

Figure 9:
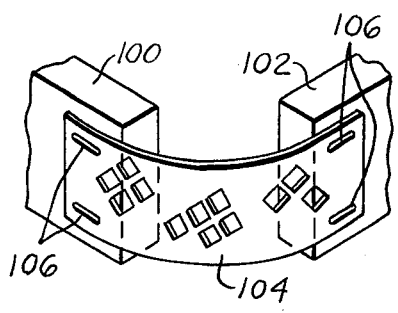

FIG. 9 is a fragmentary perspective view showing a manner in which the rails that are connected by the joint could be interconnected prior to forming the joint.

Figure 10:
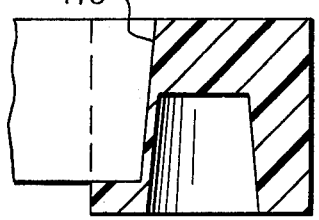
Figure 11:
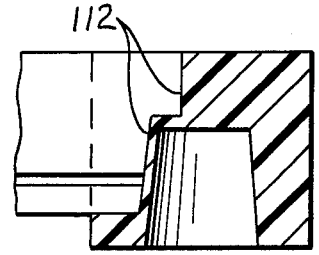

FIGS. 10 and 11 are fragmentary sectional views showing ways in which the ends of the rails could be modified.

Figure 12:
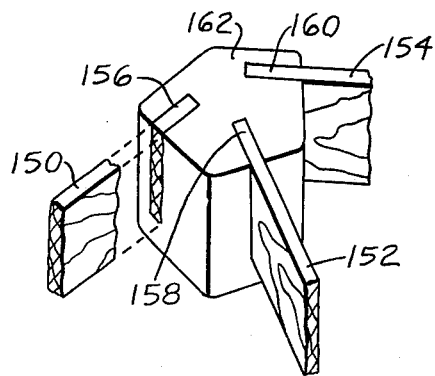

FIG. 12 is a perspective view showing another type of furniture joint made according to the present invention.

BRIEF SUMMARY OF THE INVENTION

According to the present invention, elements of the frame of an article of furniture, such as wood rails are interconnected by casting plastic material about the ends of the rails so that the plastic material forms a block into which the ends of the rails extend. The block may have a socket on one side to receive a leg, or the blocks may be molded directly on the leg.

The plastic employed can be any of several well known types which will adhere tightly to wood, such as a polyester resin filled with wood flour up to about 30 per cent by weight, or an epoxy resin filled with wood flour. Polystyrene, or polyurethane with or without a blowing agent herein, or a phenolic resin, could also be employed, all thereof preferably containing filler such as wood flour. All of the plastics referred to pass through an irreversible curing cycle when setting up and thereby form a permanent solid block at the joint being formed.

A plastic made by General Electric Co., and sold under the name of Noryl can also be used. This plastic is a member of the polyphenyleneoxide family of plastics.

It is possible, also to employ thermosetting resin, preferably with a filler, such as wood flour, wherein heat is supplied to the joint after casting to set up the molding material.

DETAILED DESCRIPTION OF THE INVENTION

Referring to the drawings somewhat more in detail, FIGS. 1 and 2 show one corner of an article of furniture, such as a piano or organ bench or table or the like and wherein members in the form of rails 10 and 12, which are advantageously wood, extend at an angle to each other while depending downwardly from the corner is further member in the form of a leg 14. According to the present invention, a block 16 of plastic material is cast in place over at least the ends of rails 12 and on one side is provided with a socket for receiving the upper end of leg 14, or is cast directly on the upper end of the leg.

FIG. 3 will show that block 16 on top is substantially coplanar with the tops of the rails but extends downwardly below the bottoms of the rails a substantial distance. FIG. 3 also shows a tapered socket 18 formed upwardly into the bottom of block 16 and the tapered upper end 20 on leg 14 that fits in the socket. A screw 21 may be provided to hold leg 14 in the socket, if desired.

As will be seen in FIGS. 1 and 2, block 16 is generally rectangular, but inside rails 10 and 12 the block 16 comprises a diagonally extending surface 22 so that the length of engagement of the material of block 16 with the rails is somewhat longer on the inside of the rails than on the outside thereof. The forming of the block 16 so as to be substantially rectangular toward the outside of the rails permits the joint to be designed so as to conform in appearance with conventional joints while the added material inside rails 10 and 12 insures firm connection of the rails with the block 16.

It has been found that plastic material such as polyester resin filled with wood flour up to about 30 per cent by weight is quite satisfactory and that block 16 when cast from such material adheres tightly to the rails 10 and 12 and does not become loose on the rails even when subjected to considerable load including erratic lateral load, and abuse and does not tend to crack or deform. This material, in view of the wood flour therein, can be worked about the same as wood, should machining be necessary, and can be stained, painted or otherwise finished and will have substantially the same touch and appearance as wood.

Other plastic materials which can be filled with wood flour and the like and employed for forming block 16 include epoxy resin, polystyrene, polyurethane, polyphenyleneoxide and phenolic resin. Thermal setting resins can also be employed but require the addition of heat to set up the material. In most cases, the resin will be free of a blowing agent, but could include such, if so desired, and will contain a filler material such as wood flour.

The tapered end 20 of the leg is tightly gripped in socket 18 and, thus, does not tend to become loose in the socket or move in the socket but may be positively secured therein by screw 21.

If extremely precise sizing of the socket is desired, the arrangement of FIG. 4 could be employed, wherein, in the corner of joint block 24 illustrated, there is a cavity 26 extending therein from one side to receive the leg and in the cavity there are the tapered metal rings 28. The rings, or ferrules directly engage the tapered end on a wood leg. Also a single tapered ferrule of metal could be fitted into the socket. The leg itself may have the metal ferrules, or rings, thereon or both the leg and socket could be provided with metal ferrules, or rings.

The forming of the joint according to the present invention is illustrated in FIGS. 5, 6 and 7 with FIGS. 5 and 6 showing a typical mold arrangement for forming the plastic block forming the joint at the juncture of a pair of rails.

In FIGS. 5 and 6 the mold, generally indicated at 30, is of rubber-like material and is made according to conventional practices with slots 32 and 34 leading into the mold cavity for receiving the ends of rails indicated by the dot-dash lines at 36 and 38. In the center of the mold at the inner ends of the rails, there is a rectangular recess portion 40 at the bottom which is dependent below the bottoms of slots 32 and 34 as will best be seen in FIG. 6.

The mold is formed of a first part 31 extending along the outside of the rails and under the lower edges thereof and a second part 33 which is disposed inside the rails. The parts 31 and 33 define therebetween on the insides of the rails, a slot 35 through which the corner region of a panel 90 extends. Rails 36 and 38 are grooved to receive the edge of panel 90. The corner joint formed by the described mold is especially useful for piano and organ benches wherein the panel referred to forms the bottom of a compartment.

Above the level of the bottom of slots 32 and 34, the cavity in the mold 30 is confined on the one side by the diagonal wall 42 which corresponds to the diagonal surface 22 of block 16. The mold of FIGS. 5 and 6 has upstanding from the bottom of the rectangular portion 40 of the tapered plug-like element 44 which forms the socket in the corner block when it is cast.

The sides of the mold 30 where the rails enter the slots 32 and 34 have lips which are preferably subjected to pressure during the casting operation as indicated by arrows 46 thereby to confine the molding material to the mold cavity and to eliminate flash running along the rails outside the limits of the mold cavity.

As will be seen in FIGS. 5 and 6, the molding material is poured into the cavity from the top so that after casting and curing the mold material, the joint is machined off on the top to make it smooth and flat. As will be seen hereinafter, another mold arrangement can be provided for pouring the joint from the bottom, in which case no machining of the joint is required after it is cast.

FIG. 7 schematically illustrates a fixture for use in making the joints with the fixture comprising a table 50. At each region where the ends of the rails approach each other, there is provided a mold 58 of the type illustrated in FIGS. 5 and 6.

Mold 58 is preferably confined by rigid members 60 on the outside and 62 on the inside so as to locate the rails and to insure that the mold does not deflect when the molding material is placed therein. By the fixturing arrangement of FIG. 7, all four joints pertaining to an article of furniture such as a piano bench or organ bench can be molded at one time with the rails firmly held in the proper relative positions so that the resulting article is of the proper size and shape and also preventing any shifting of the parts relatively during the molding process.

Depending on the particular plastic employed, a curing process is carried out. With polyester resin, for example, the material will set up in the mold and, when the material becomes hard, the flexible rubberlike mold can be stripped therefrom and the material is then completely cured by subjecting it to a temperature of about 100 degrees Fahrenheit or more for about a half hour. The particular curing cycles for the other plastics given as examples might vary somewhat from that given above.

A feature of the present invention is that the inner surfaces of the mold cavity against which surfaces of the block are formed which are exposed in use, can readily be textured so that the exposed surfaces of the corner block will have the exact appearance of wood. This texturing of the surfaces of the mold can easily be accomplished by making the mold on a wooden form which is textured in conformity with the texture desired on the finished work member.

The corner joint made up using the mold of FIGS. 5 and 6 is poured from the top of the joint, as mentioned, but FIG. 8 shows a modification whereby the joint can be poured from the bottom so that no finishing is necessary for the upper end of the joint when it is completed.

In FIG. 8, the mold is indicated at 70 and comprises a cavity 72 for receiving the mold material. Rails 74 and 76 will be seen extending into the mold cavity with the edges of the rails which will be uppermost when the article is completed flush with the bottom surface of the cavity. The molded joint surface formed on the bottom surface of the mold cavity will be the top surface of the joint when the joint is completed. The upper open end of the cavity is closed by a cover member 78 from which depends a form 80 which will define the tapered socket into which the leg is to extend.

The mold can be filled through the pour hole 82 provided in top member 78. As has been described, the mold is preferably supported by rigid confining members 84 which prevent deflection of the rails and the mold when the molding material is placed in the mold.

For an article such as a piano or organ bench, the top part usually has a bottom panel therein and, as will be seen in FIGS. 1, 2 and 8, this bottom panel, indicated at 90 and fitted in slots 92 in the rails, can advantageously extend into the mold cavity so as to be engaged by the molding material poured into the cavity and thereby be fixedly held in place after the molding operation is completed. The bottom panel 90 still further reinforces the joint.

When bottom panel 90 is employed, the inner part of the mold is separated to accommodate the panel.

As shown in FIG. 9, rails 100 and 102 can be connected by a formed strip 104 of, for example, expanded metal which is connected to the rails as by staples 106. The expanded metal may not be necessary, but may represent a convenience in holding the rails in position during the setting up of the rails preparatory to a molding operation.

While it has been found that square ended rails are satisfactory and form substantially rigid connections with the corner block, a larger area of each rail can be engaged by the material of the corner block by tapering the end of the rail as at 110 in FIG. 10 or by both tapering and forming a step in the end of the rail as indicated at 112 in FIG. 11.

FIG. 12 shows how three members 150, 152 and 154, rail members, for example, and disposed in angularly related relation to each other in the same plane could have the adjacent end portions 156, 158 and 160 fixedly interconnected by casting or molding a block 162 in place about the end portions of the rails.

As in the case of the previously described modifications, a rubber-like mold could be provided into which the molding material is cast, but it is also possible, of course, with the modification of FIG. 12, as well as with any of the other modifications, to provide a rigid mold so arranged that the mold could be readily removed from the block when the block was cast and at least partially set up. Further, it will be evident that the block 162 in FIG. 12 could be formed with a socket for receiving the upper end of a leg member or the like.

It would be appreciated from the foregoing detailed description that the forming of joints between members of substantially any nature is contemplated, although the particular field of use in which the invention is especially adapted is in the filed of furniture in which rail members are interconnected in angularly related relation with or without a leg being provided at the region where the joint is provided between the rail members.

The practice of the present invention results in greatly superior corner joints because the joints are stronger and do not tend to become loosened, even under severe loads, while, furthermore, the joints are much less expensive than joints according to the prior art and can be made quite quickly with relatively simple equipment and easily followed procedures.

Modifications may be made within the scope of the appended claims.

What is claimed is:

1. In a furniture joint construction; at least two rigid wood-like rail members substantially rectangular in cross section and having parallel outer and inner side surfaces and having top and bottom edges disposed in respective parallel planes, said rail members having a greater dimension between said edges than between said side surfaces, said members being disposed with the said inner side surfaces at an angle of less than 180° to one another, each member having one end part in juxtaposed relation to one end part of the other member, and a block of plastic material which undergoes an irreversible reaction upon curing molded and cured in situ on the juxtaposed said one end parts of said rail members and rigidly bonded thereto, said block of plastic material being rigid when cured and engaging at least the outer and inner side surfaces and bottom edges of said members and bonded to said outer and inner side surfaces and bottom edges, said block having outer faces spaced outwardly from the outer side surfaces of said rail members and having inner face means extending between the inner side surfaces of said rail members, said block having a top face substantially in the plane of the top edges of said members and having a bottom face disposed below said bottom edges of said rail members, said block having a socket formed therein through the bottom face and extending upwardly into said block between the said one end parts of said members, said socket adapted to receive the upper end of a leg member, said block being of ample dimensions to transmit substantial loads between said rail members, a panel in a plane between the planes of said top and bottom edges of said rail members, said rail members being grooved on the inner sides to receive the adjacent edges of said panel, and the region of said panel near the said juxtaposed one ends of said members extending into said block and being bonded thereto.

2. A joint construction according to claim 1 in which said plastic material contains a filler material which comprises wood flour, said filler material being included in the plastic material in an amount up to about 30 per cent by weight.

3. A furniture joint construction according to claim 1 in which said plastic material is selected from the class which includes polystyrene, polyurethane, polyphenyleneoxide, polyester, phenolics and epoxy.

4. A furniture joint construction according to claim 1 in which said socket is tapered, and metal ferrule means mounted in the tapered socket.

5. A furniture joint construction according to claim 1 in which said inner face means of said block includes an upper portion which extends the full height of said rail members and which extends diagonally between the inner side surfaces of the rail members, said inner face means of said block including a lower portion extending downwardly below the bottom edges of said rail members, that part of said block which is disposed beneath the bottom edges of said rail members being rectangular when viewed from below, said socket having the open lower end in about the middle of the bottom face of said rectangular part of said block.

* * * * *